United States Patent
Messager (10) Patent No.: US 7,518,345 B2
(45) Date of Patent: Apr. 14, 2009

(54) DEVICE FOR CONVERTING A CONTINUOUS SUPPLY VOLTAGE INTO A CONTINUOUS OUTPUT VOLTAGE AND CORRESPONDING ELECTRONIC CIRCUIT

(75) Inventor: Philippe Messager, Nantes (FR)

(73) Assignee: Atmel Nantes SA, Nantes (FR)

( * ) Notice: Subject to any disclaimer, the term of this patent is extended or adjusted under 35 U.S.C. 154(b) by 178 days.

(21) Appl. No.: 11/490,488

(22) Filed: Jul. 20, 2006

(65) Prior Publication Data

US 2007/0046269 A1    Mar. 1, 2007

(30) Foreign Application Priority Data

Jul. 22, 2005    (FR)    ................................. 05 07871

(51) Int. Cl.
*G05F 1/618* (2006.01)
(52) U.S. Cl. ................... 323/222; 323/285; 323/299
(58) Field of Classification Search ................. 323/222, 323/282, 285, 299
See application file for complete search history.

(56) References Cited

U.S. PATENT DOCUMENTS

| | | | | |
|---|---|---|---|---|
| 5,161,097 | A * | 11/1992 | Ikeda | ............................. 363/124 |
| 6,977,488 | B1 * | 12/2005 | Nogawa et al. | ............... 323/271 |
| 7,012,413 | B1 * | 3/2006 | Ye | ................................ 323/284 |
| 7,095,215 | B2 * | 8/2006 | Liu et al. | ....................... 323/222 |
| 7,279,878 | B2 * | 10/2007 | Ootani et al. | .................. 323/285 |
| 7,292,016 | B2 * | 11/2007 | Wake | ............................ 323/271 |

OTHER PUBLICATIONS

B. Sahu et al., "A High-Efficiency, Dual-Mode, Dynamic, Buck-Boost Power Supply IC for Portable Applications," Proceedings of the 18th Int'l Conf. on VLSI Design, Jan. 2005, pp. 1-4.
E. McShane et al., "A CMOS Monolithic 5-MHz, 5-V, 250-mA, 56% Efficiency DC/DC Switch-Mode Boost Converter with Dynamic PWM for Embedded Power Management," Conf. Record of the 2001 IEEE Industry Applications Conf. 36th IAS Annual Meeting, vol. 1 of 4, Conf. 36, XP010561770, Sep. 2001, pp. 653-657.
R. Naim et al., "H Control of Boost Converters," Applied Power Electronics Conference and Exposition, Conf. Proceedings 1995, 10th Annual Conf., Dallas, TX., Mar. 1995, pp. 719-722.
M. Hooper et al., "A 5MHZ Silicon CMOS Hierarchical Boost DC-DC Converter Design Using Macromodels for A IU Process," The 2002 45th Midwest Symposium on Circuits and Systems. Conf. Proceedings, vol. 1 of 3, Tulsa, OK, Aug. 2002, pp. 351-354.

* cited by examiner

*Primary Examiner*—Jeffrey L Sterrett
(74) *Attorney, Agent, or Firm*—Westman, Champlin & Kelly, P.A.

(57) ABSTRACT

A device for converting a continuous supply voltage into a continuous output voltage includes at least one inductor accumulating energy during an accumulation time and delivering said accumulated energy during a discharge time, so that said output voltage has a value that is greater than or equal to that of said supply voltage. An oscillator controls said accumulation and discharge times, in which a period is equal to a sum of said accumulation time and said discharge time and a cyclic ratio is equal to the ratio of said accumulation time to said period. The oscillator includes a mechanism for controlling said period and said cyclic ratio according to said supply voltage and said output voltage.

18 Claims, 9 Drawing Sheets

DEVICE FOR CONVERTING A CONTINUOUS SUPPLY VOLTAGE INTO A CONTINUOUS OUTPUT VOLTAGE AND CORRESPONDING ELECTRONIC CIRCUIT

CROSS-REFERENCE TO RELATED APPLICATION

None.

FIELD OF THE INVENTION

The field of the invention is that of voltage conversion, and more specifically the conversion of a continuous voltage into another continuous voltage (also called DC/DC conversion).

More precisely, the invention relates to an inductive DC/DC converter (i.e. operating with an inductor), enabling a continuous voltage to be generated from a lower supply voltage.

BACKGROUND OF THE INVENTION

Solutions of the Prior Art and Their Disadvantages

Figure 1A:
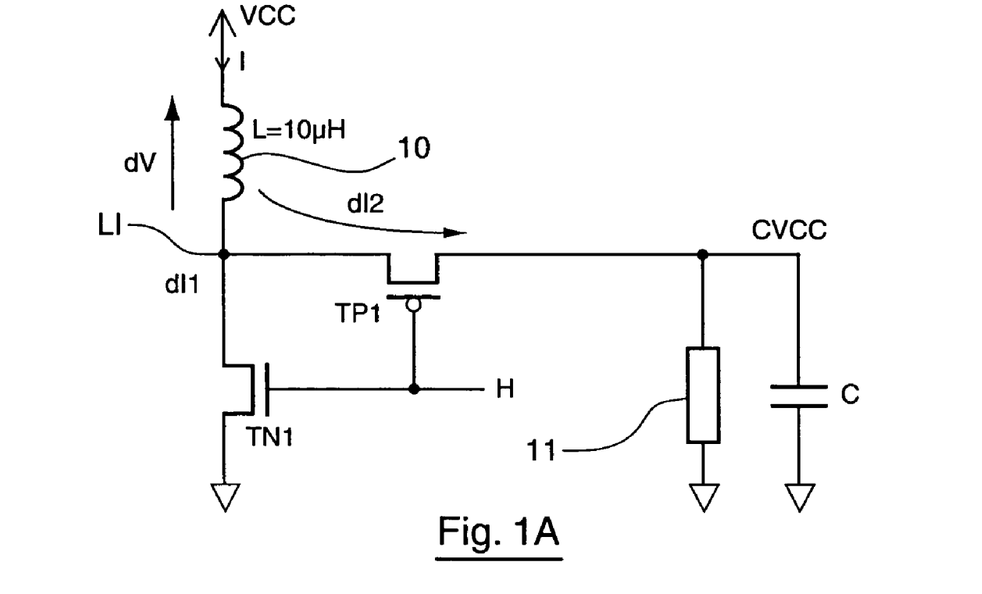
FIG. 1A shows a diagram of an inductive DC/DC converter of the prior art, while FIG. 1B more specifically shows the operation.
Figure 1B:
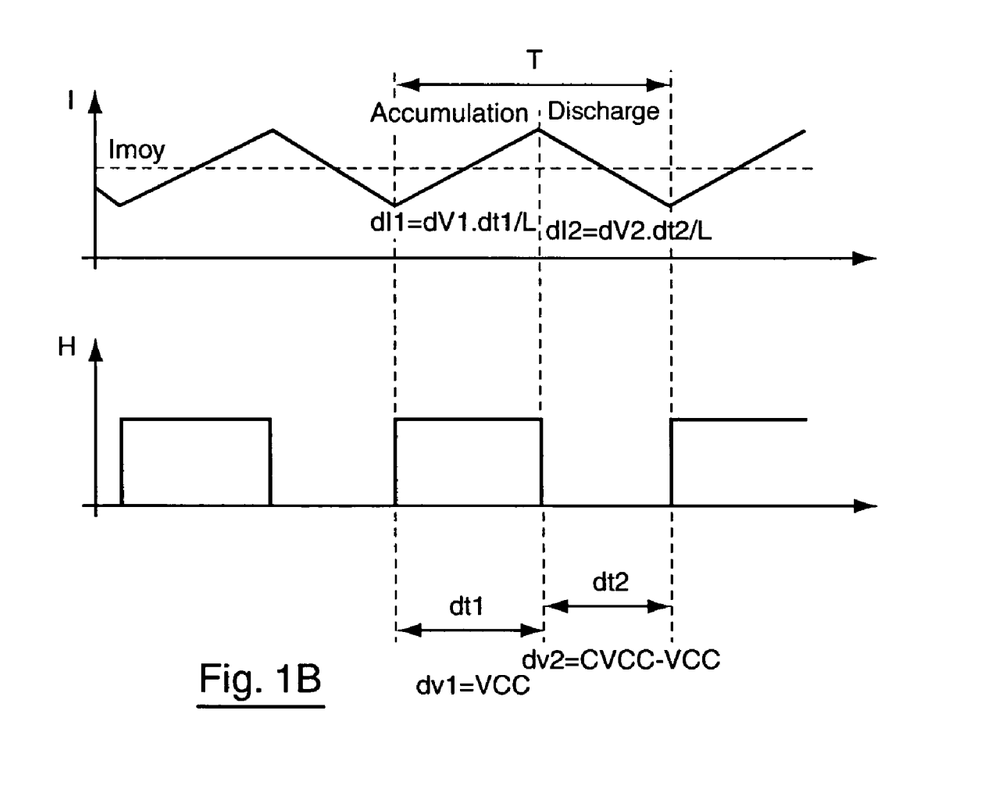

The operating principle of such inductive DC/DC converters is shown by FIGS. 1A and 1B. Such converters conventionally include:

an inductor 10, that in this case has an inductance L=10 μH;
two transistors TN1 and TP1, controlled by a clock signal H;
a load 11;
a filtering capacity C.

The converter is powered by a continuous supply voltage VCC, and generates at the output a continuous output voltage CVCC. Its operation is regulated by two successive phases, namely:

Phase 1: Energy Accumulation

During this first phase, the transistor TN1 makes it possible to accumulate energy in the inductor 10 by increasing the current passing through it according to the rule $dV1=L.dI1/dt1$, where dV1 designates the potential difference at the terminals of the inductor 10 during this first phase. When the control signal H=1, the first transistor TN1 is on and the second transistor TP1 is off. The voltage at the node designated by LI in FIG. 1A is then zero (LI=0), therefore dV1=VCC (where VCC is the supply voltage, also called battery voltage), with dt1 being the time of energy accumulation in the inductor 10.

Phase 2: Energy Discharge

In a second phase of operation, the control signal has the value H=0, the transistor TN1 is off, and the transistor TP1 is on. The inductor 10 then discharges its energy in the load 11, by increasing the voltage at the node L1 so as to prevent a break in the current passing through it. Then $dV2=L.dI2/dt2$, where dV2 designates the potential difference at the terminals of the inductor 10 during this second discharge phase, dt2 designating the inductor discharge time. This makes it possible to obtain an output voltage CVCC greater than the supply voltage VCC.

FIG. 1B shows, in the upper curve, the change in the current I in the inductor 10, according to the value of the control signal H of transistors TN1 and TP1. The current I thus increases during the phase of energy accumulation in the inductor, during which H=1, and decreases in the energy discharge phase, during which H=0, around a mean current value Imoy.

The sum of the accumulation dt1 and discharge dt2 times form a period T of oscillation of the converter: T=dt1+dt2. During the accumulation, during dt1, dV1=VCC, and during the discharge that lasts dt2, dV2=CVCC−VCC.

In addition, the cyclic ratio of such an oscillation is defined as follows:

$$R = \frac{dt1}{T}.$$

Figure 2A:
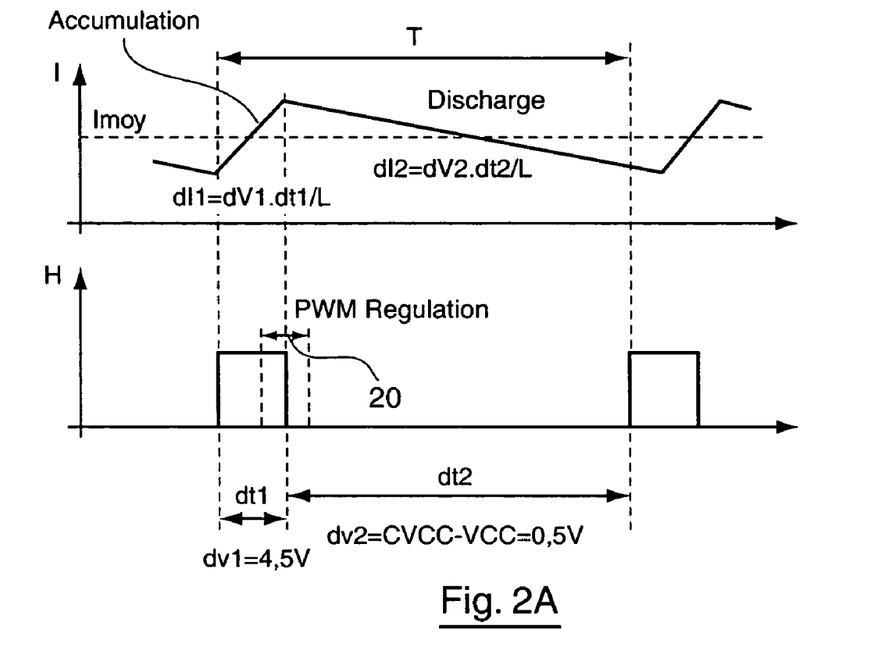
FIGS. 2A and 2B, also discussed in relation to the prior art, show the operation of the inductive DC/DC converter of FIG. 1A, when the supply voltage is high, and when this supply voltage is low.
Figure 2B:
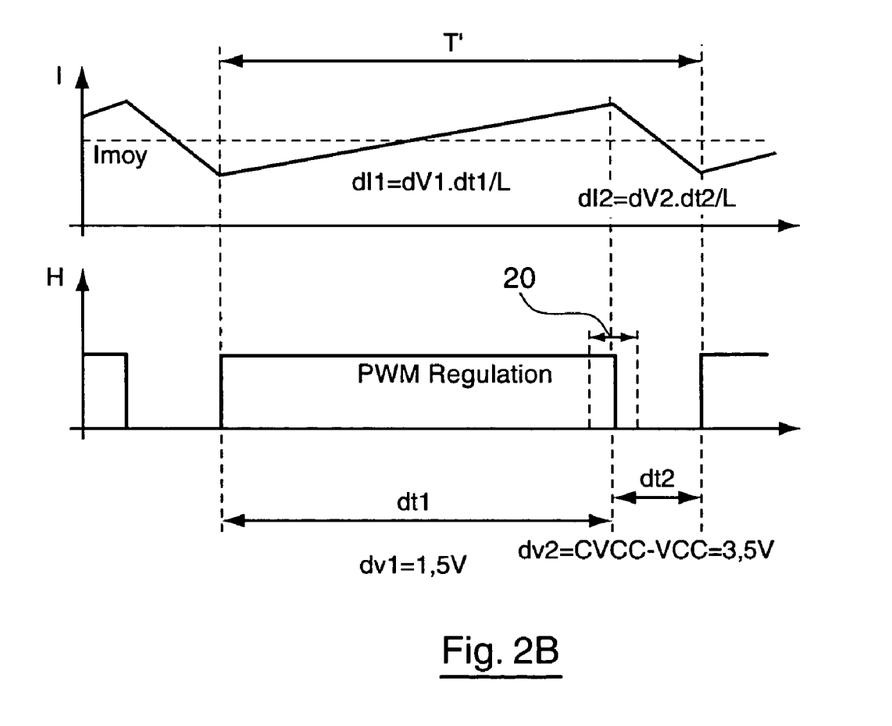
Figure 3:
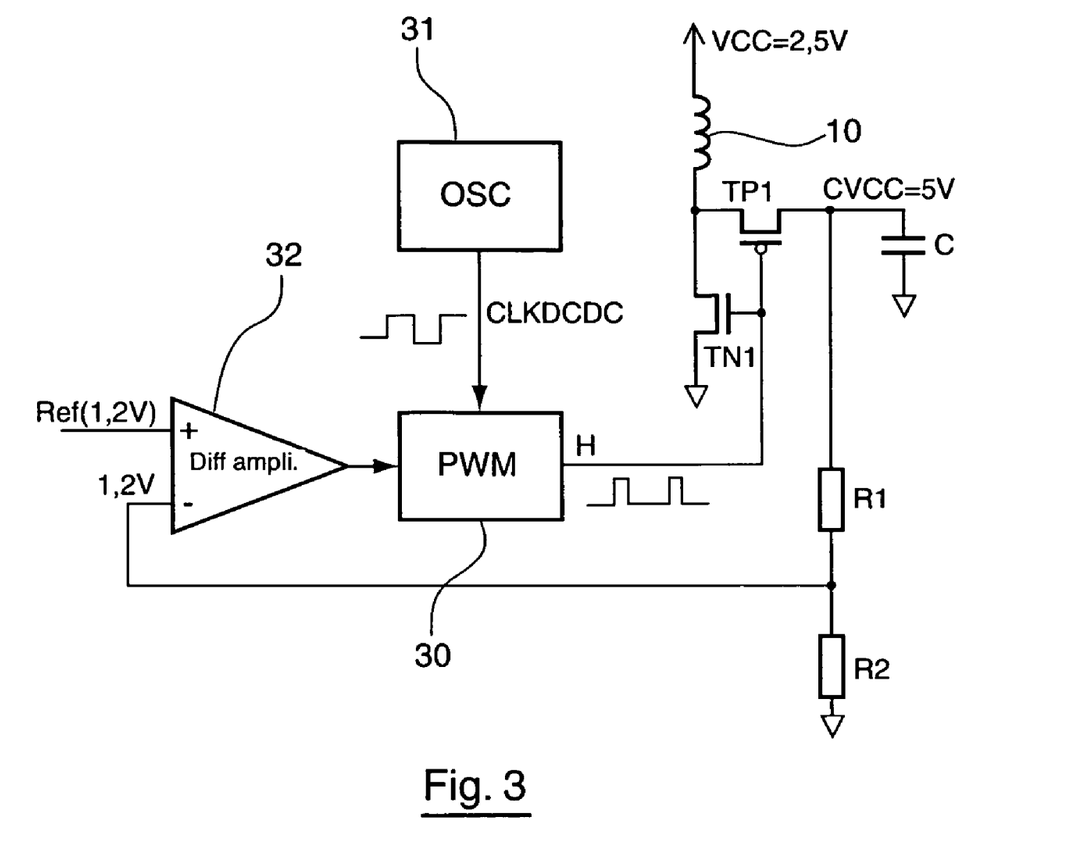
FIG. 3 shows a more detailed diagram of the inductive DC/DC converter of FIG. 1A, in which the means for generating the clock signal controlling the times for accumulation and discharge of the inductor are visible.

FIGS. 2A and 2B more specifically show the accumulation and discharge phases for an output voltage CVCC=5 V, when the supply voltage is high (VCC=4.5 V), and when the supply voltage is low (VCC=1.5 V). FIG. 3 shows a full diagram of the DC/DC converter of FIG. 1A, presenting the means for generating the clock signal H and for regulating the overall operation of the converter.

In this example, the load 11 of the converter is not shown for the sake of simplification. Two resistors R1 and R2, of which the values are chosen so that $$1,2V = 5V * \frac{R2}{(R2+R1)},$$

form a dividing bridge. The clock signal H controlling the on or off state of the transistors TN1 and TP1 is generated by an element 30, called PWM (for "Pulse Width Modulation") performing the modulation of the cyclic ratio of the converter. This PWM 30 receives, at a first input, a signal CLKDCDC from an oscillator OSC 31, and, at a second input, the signal generated at the output of the differential amplifier 32.

Such a differential amplifier is powered by a reference voltage at 1.2 V, called ref (1.2V), and by the voltage of the node located between the two resistors R1 and R2.

When the output voltage CVCC is greater than 5V (value constituting the objective to be reached at the output), the value of the signal generated at the output of the differential amplifier 32, and provided at the input of the PWM 30, decreases, so that the PWM 30 causes the cyclic ratio of the signal H to the signal CLKDCDC to decrease, by adjusting the time of accumulation dt1 in the inductor 10. Conversely, when CVCC<5 V, the value of the signal generated by the differential amplifier 32 increases so that the PWM causes the cyclic ratio to increase. At equilibrium, the differential amplifier generates a non-zero voltage (called equilibrium voltage) to regulate the PWM 30.

FIGS. 2A and 2B will first be described briefly, before describing in detail the operation of the PWM 30. Each of these figures shows an upper curve representing the change in the current I in the inductor 10, as a function of time, and a lower curve representing the control signal H generated by the PWM 30. As shown by the arrow 20, the PWM 30 can act on the accumulation dt1 and discharge dt2 times in order to adjust the cyclic ratio R according to the operating state of the converter.

FIG. 2A relates to the case in which the supply voltage VCC=4.5 V, and the output voltage CVCC=5 V. In this case, during the accumulation phase, the voltage dV1 at the terminals of the inductor 10 is dV1=VCC=4.5 V, and the charge time dt1 must therefore be very short. The discharge time dt2, by contrast, is long.

FIG. 2B relates to the case in which the supply voltage VCC=1.5 V, and the output voltage CVCC=5 V. In this case, unlike in the previous case, VCC<<CVCC, and the accumulation time dt1 must therefore be longer than the discharge time dt2.

It is noted in this configuration that, if the maximum cyclic ratio $$R = \frac{dt1}{dt1 + dt2}$$

is limited to 50%, the output voltage CVCC cannot be greater than double the supply voltage VCC.

The regulation of the system of FIG. 3 is achieved by the combination of the resistor bridge consisting of R1 and R2, the voltage reference (1.2 V), the differential amplifier 32, the oscillator 31 and the PWM 30. These different elements combined indeed make it possible to adjust the cyclic ratio dt1/T, where it is noted that T is the period of the oscillator T=dt1+dt2.

Such a regulation is achieved when dI1=dI2, which makes it possible to ensure the stability of the mean current Imoy in the inductor 10. Using the following notations, we then have $$\frac{dV1 \cdot dt1}{L} = \frac{dV2 \cdot dt2}{L},$$

with VCC*dt1=(CVCC-VCC)*dt2.

It is then deduced that, when the supply voltage VCC decreases, it is necessary, to achieve the regulation, for the accumulation time dt1 to increase and/or for the discharge time dt2 to decrease. Conversely, when the level VCC becomes too high, the accumulation time dt1 decreases (less accumulation) and dt2 increases (more discharge time).

A first disadvantage of this DC/DC converter of the prior art is that it has a natural tendency to be unstable. The loop system shown in FIG. 3 is therefore difficult to produce.

To solve this problem of instability, it has been envisaged to voluntarily cause the regulation levels to oscillate between two levels V1 and V2 (between 4.95 V and 5.05 V, for example). In other words, the output voltage CVCC oscillates between 4.95 V and 5.05 V, instead of being constant and equal to 5 V. The oscillation of the system, while not cancelled out, is thus controlled rather than being left free and/or erratic.

However, a disadvantage of this solution of the prior art is that this slight oscillation in the output voltage CVCC reduces the precision. Moreover, the current consumed on the power supply oscillates and has a tendency to create noise, in particular if the power supply is a battery with a high output resistance. Another disadvantage of this prior art technique is that it is incompatible with a DC/DC converter having a precise overload current control, which current can reach high values so as to move from regulation level V1 to regulation level V2.

To more precisely illustrate these various disadvantages, we will consider the case of a DC/DC converter, as shown in FIG. 3, that generates a continuous output voltage CVCC=5 V, and of which the supply voltage VCC is capable of varying between 5 V and 2.5 V. For example, the power supply is provided by a battery, which generates 5 V when it has just been charged, but of which the voltage falls to 2.5 V when it is discharged, after a certain time of use.

As it is desirable to generate an output voltage of CVCC=5 V, and the DC/DC converter must be capable of functioning with a supply voltage VCC=2.5 V, it is necessary, as shown above, for the cyclic ratio to be at least equal to 50%. Indeed, it is noted that the regulation is achieved when dI1=dI2, i.e. when VCC*dt1=(CVCC-VCC)*dt2, from which it is deduced that $$R = \frac{dt1}{dt1 + dt2} = 1 - \frac{VCC}{CVCC}.$$

Conversely, when the battery is properly charged, and VCC=4.8 V, we have $$R = 1 - \frac{4.8V}{5V} = 4\%,$$

therefore a cyclic ratio of around 5% would be adequate. At this voltage VCC=4.8 V, if the differential amplifier 32 detects an output voltage CVCC that is too low (following a current draw, for example), it will act on the PWM 30 so as to increase the cyclic ratio $$R = \frac{dt1}{dt1 + dt2}$$

of the signal H.

As the reaction time of the complete servo loop of FIG. 3 is long (due to the presence of the inductor 10 in which it is necessary to accumulate energy, before delivering it in order to increase the output voltage CVCC), a plurality of periods may be necessary in order to restore the output voltage CVCC to its level CVCC=5 V. The cyclic ratio R can then reach its maximum (in this case 50%) before the output voltage returns to its level of 5 V.

However, when R=50%, a supply voltage VCC=4.8V generates a very high current in the inductor 10, regulated by the equation dI1=VCC*dt1/L. A very large amount of energy is then accumulated in the inductor 10. When the output voltage CVCC returns to its set point level CVCC=5 V, it is impossible to rapidly reduce the large amount energy accumulated in the inductor 10, even by reducing the cyclic ratio R to a few percent.

There is then a risk of an overshoot, causing a reduction in the maximum cyclic ratio.

Conversely, when the output voltage CVCC becomes too low again, no energy is accumulated in the inductor (or at least an inadequate amount of energy), and an undershoot then takes place.

The succession of overshoots and undershoots are the cause of the instability of the DC/DC converter of the prior art. Moreover, the overload control may be activated even though there is only a low output charge.

SUMMARY OF THE INVENTION

A device for converting a continuous supply voltage into a continuous output voltage includes at least one inductor accumulating energy during an accumulation time and delivering said accumulated energy during a discharge time, so that said output voltage has a value that is greater than or equal to that of said supply voltage. An oscillator controls said accumulation and discharge times, in which a period is equal to a sum of said accumulation time and said discharge time and a cyclic ratio is equal to the ratio of said accumulation time to said period. The oscillator includes a mechanism for controlling said period and said cyclic ratio according to said supply voltage and said output voltage.

Thus, this aspect of the invention is based on an entirely novel and inventive approach to DC/DC-type voltage conversion based on an inductor. Indeed, the technique is based on the creation of an oscillator capable of simultaneously adjusting the cyclic ratio and the frequency of oscillations, according to the output voltage CVCC and the supply voltage VCC.

While the inductive DC/DC converters of the prior art included means for adjusting only the cyclic ratio dt1/T according to the level of the output voltage CVCC, the oscillator of the converter herein described takes into account the values of the supply voltage VCC and the output voltage CVCC so as to adapt, not only the cyclic ratio dt1/T, but also the frequency 1/T, and thus to optimize the time of accumulation and discharge of the inductor.

An inductive DC/DC converter is thus obtained, which is much more stable than that of the prior art, and which enables an output signal to be generated with little or no oscillation. The noise on the power supply is also reduced, and the starting current is limited. Furthermore, unlike the converters of the prior art, it is no longer necessary to provide a specific system for protection of the converter against any overloads, as such overloads no longer occur, owing to an automatic levelling of the operation of the converter, regardless of the supply voltage.

Said control mechanism advantageously include means for decreasing, respectively increasing said period, and means for increasing, respectively decreasing said cyclic ratio, which are activated when said supply voltage decreases, respectively increases.

Indeed, when the supply voltage decreases, the inductor charges more slowly, because the mutual conductance of the accumulation is low, and it is therefore necessary to increase the cyclic ratio dt1/T. Similarly, when the supply voltage is low, the discharge of the inductor is fast, and it is therefore necessary to frequently refresh the output voltage so as to prevent it from falling too low: therefore, it is chosen to reduce the period T of oscillation of the converter.

Said control mechanism can include a first delay element enabling said accumulation time to be regulated, and a second delay element enabling said discharge time to be regulated.

Thus, dt1 and dt2 are regulated independently, which makes it possible to adjust the period T=dt1+dt2, and the cyclic ratio dt1/T.

According to an advantageous feature, said first and second delay elements each include at least one capacitance that can be charged from at least one current controlled by said supply voltage and/or said output voltage.

Stated another way, a principle of operation of the converter is based on the controlled current capacitance charge. The time for charging the capacitances introduces a delay constituting dt1 and/or dt2, which is directly related to the currents powering these capacitances and therefore substantially proportional to the values of the input and/or output voltages.

According to a first advantageous feature, said first delay element includes at least one first capacitance that can be charged from a first current substantially proportional to said supply voltage, and said accumulation time is substantially equal to a time for charging said first capacitance.

According to a second advantageous feature, said second delay element includes at least one second capacitance that can be charged from a second current substantially proportional to a difference between said supply voltage and said output voltage, and in that said discharge time is substantially equal to a time for charging said second capacitance.

Said oscillator is preferably a ring oscillator.

According to one feature of the invention, said first and/or second delay elements each include at least two basic delay modules in cascade each including at least one of said capacitances chargeable by the controlled current. It is thus possible to more finely adjust the accumulation and discharge times dt1 and dt2.

Said ring oscillator advantageously also includes an odd number of inverters at the output of said first and second delay elements, forming means for formatting a signal controlling said accumulation and discharge times of said inductor, also referred to as a clock signal and a control signal, CLKDCDC below.

Another aspect of the invention is an electronic circuit including a conversion device as described above.

Other features and advantages of the invention will become more clear in the following description of a preferred embodiment, given by way of an illustrative and non-limiting example, and the appended drawings, wherein:

DETAILED DESCRIPTION OF ILLUSTRATIVE EMBODIMENTS

A general principle herein described involves taking into account the input and output voltages of an inductive DC/DC converter in order to regulate the cyclic ratio and the frequency of oscillations controlling the inductor accumulation and discharge times. In an embodiment of the invention, which will be described in greater detail below, the inductive DC/DC converter implements a controlled current capacitance charge.

More specifically, and as indicated above in relation to FIGS. 1A and 1B, we have $di1=VCC*dt1/L$, and $di2=(CVCC-VCC)*dt2/L$.

Consequently, when the supply voltage is high (for example, for VCC=4.5V when the output voltage CVCC=5 V), the mutual conductance of di1 is high (which corresponds to a rapid charge of the inductor 10), while the mutual conductance of di2 is low (which corresponds to a slow discharge of the inductor 10).

Conversely, if the supply voltage is low (for example VCC=1.5 V), the mutual conductance of di1 is low and that of di2 has increased.

A principle of operation of the converter herein described therefore consists of reducing the frequency 1/T of the oscillator and reducing the maximum cyclic ratio $R_{max}$ (where R=dt1/T) if VCC increases, because the discharge is then slow and the charge is very fast. By contrast, when the VCC decreases, the frequency and the maximum cyclic ratio are increased.

Indeed, since the discharge is slow at 4.5 V, it is not necessary to refresh the voltage CVCC often, unlike in the case (corresponding to FIG. 2B) in which the supply voltage VCC is low. The period T of oscillations directly influences the oscillation of the output CVCC. At 1.5 V, the discharge is fast. It is therefore necessary to refresh the CVCC more often, so that this output voltage CVCC does not drop too low.

Figure 4A:
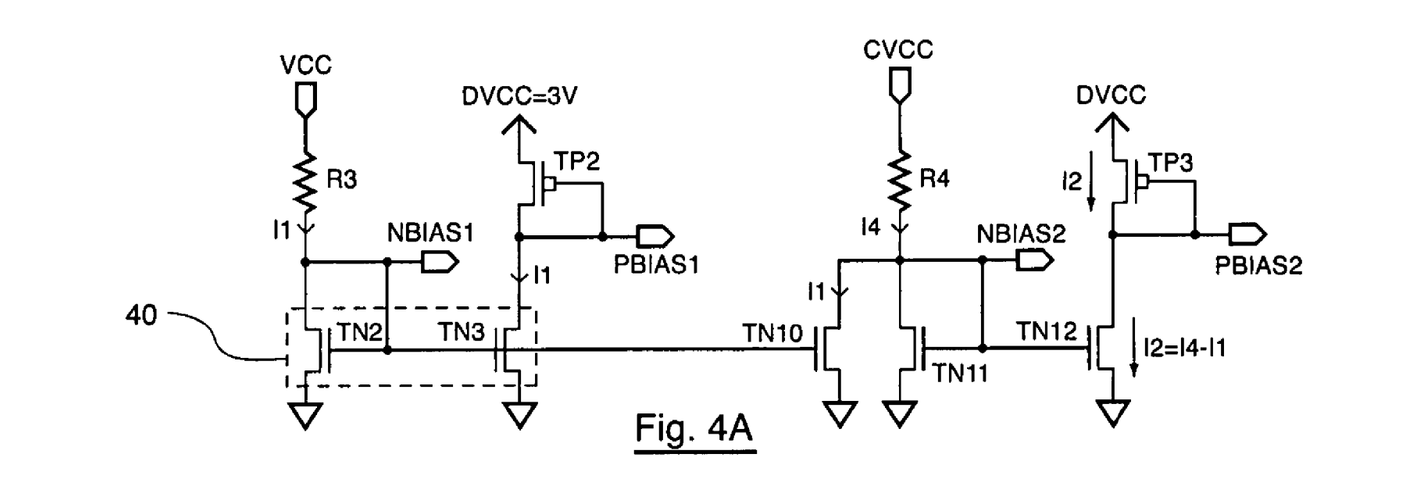
FIGS. 4A and 4B show a diagram of the oscillator of the inductive DC/DC converter of the invention.
Figure 4B:
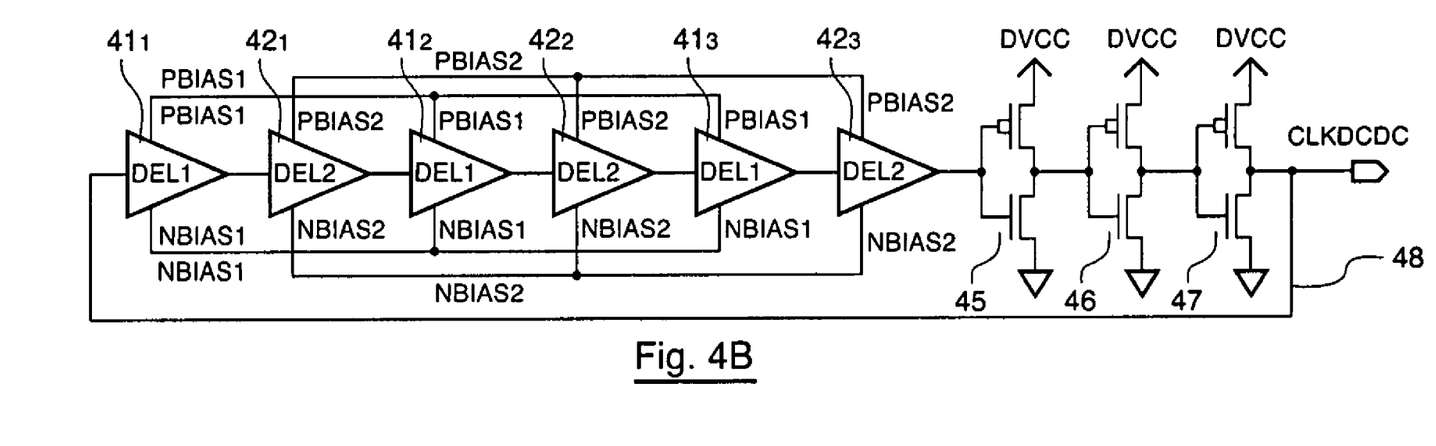

In relation to FIGS. 4A and 4B, an embodiment of the oscillator of the inductive DC/DC converter herein described is shown. Such an oscillator replaces the oscillator 31 of the converter of the prior art shown in FIG. 3, and generates a control signal CLKDCDC, which powers the PWM 30: the latter then generates a clock signal H that acts directly on the transistors TN1 and TP1 controlling the accumulation and discharge of the inductor 10. In other words, the inductive DC/DC converter remains identical, in principle, to that described above in relation to FIG. 3, with the exception of the oscillator, the operation of which is described in detail below.

FIG. 4A shows the principle of generation of potentials NBIAS1, PBIAS1, and NBIAS2, PBIAS2, which power the delay elements in cascade DEL1, DEL2 shown in FIG. 4B. The module of FIG. 4A is powered by the supply voltage VCC and by the output voltage of the converter CVCC. Owing to the resistor R3, a current I1 is created, which is substantially proportional to the supply voltage VCC. A first current mirror 40, consisting of two transistors TN2 and TN3, makes it possible to recopy this current I1 in the branch connecting the transistor TN3 to the transistor TP2.

The current I1 is also copied, by way of the current mirror consisting of TN3 and TN10, in the latter transistor TN10, which also absorbs a portion of the current I4 proportional to the output voltage CVCC generated in the resistor R4. The current I2 in the transistor TN11 therefore corresponds to the difference in the currents generated in the resistors R4 and R3 (I2=I4−I1), and is therefore proportional to CVCC−VCC (on the condition that R3 and R4 are substantially equal values).

The current mirror constituted by transistors TN11 and TN12 makes it possible to recopy the current I2 in the transistor TN11, in the branch connecting the transistor TN12 to the transistor TP3.

Transistors TP2 and TP3 are both powered by a core voltage DVCC=3 V. The signal CLKDCDC that controls the on or off state of the transistors TN1 and TP1 (see FIG. 1A) is generated, according to the assembly of FIG. 4B, by potentials NBIAS1, PBIAS1, NBIAS2 and PBIAS2.

The assembly of FIG. 4B includes three delay elements in cascade DEL1 making it possible to generate the accumulation time dt1 of the inductor 10, and three delay elements in cascade DEL2 making it possible to generate the discharge time dt2 of the inductor 10, as well as three inverters 45, 46 and 47, enabling the signal to be formatted. As indicated by the feedback loop 48, the oscillator herein illustrated is a ring oscillator, which uses the delays induced by the propagation time between the fifteen (odd number) inverters (namely the three inverters 45, 46 and 47 and the twelve inverters contained two-by-two in each of the delay elements DEL1 and DEL2) so as to format the signal CLKDCDC.

The delay elements DEL1 are powered by the current I1 proportional to the supply voltage VCC. When the VCC increases, the current I1 in R3 increases, making it possible to charge the capacitances C1 and C2 of the delay element DEL1 more quickly, and thus to reduce the accumulation time dt1 according to the supply voltage VCC.

The delay elements DEL2 are powered by the current I2, proportional to the difference of the output and supply voltages CVCC−VCC. When the VCC increases, at a constant CVCC, the current I2 in R4 decreases, and the capacitances C3 and C4 of the delay element DEL2 is then charged more slowly, which increases the discharge time dt2 in the inductor 10.

Figure 5:
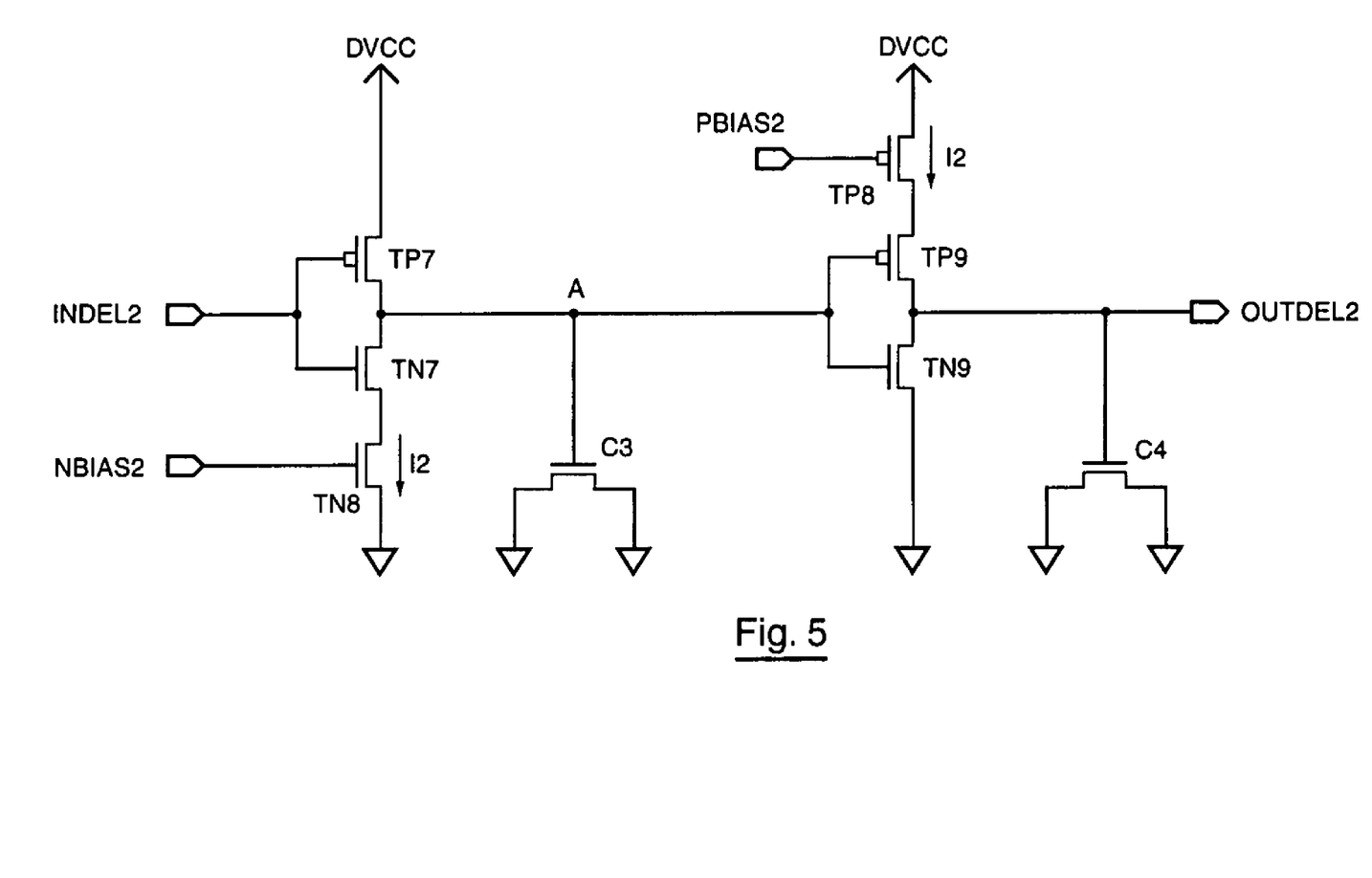
FIG. 5 more specifically shows the second delay element DEL2 regulating the discharge time dt2 of the inductor.

FIG. 5 more specifically shows the structure of the delay element DEL2 enabling the discharge time dt2 of the inductor 10 to be generated.

The transistors TN11 (FIG. 4A) and TN8 (FIG. 5) form a current mirror making it possible to recopy the current I2 in the branch of DEL2 connecting the transistors TN8 and TN7. Similarly, the transistors TP3 (FIG. 4A) and TP8 (FIG. 5) form a current mirror making it possible to recopy the current I2 in the branch of DEL2 connecting the transistors TP8 and TP9.

Moreover, the assembly consisting of transistors TN7 and TP7 and transistors TP9 and TN9 form two inverters.

When the potential INDEL2 changes from a low logic level (i.e. 0) to a high logic level (i.e. 1, or more specifically INDEL2=DVCC=3 V), the transistor TP7 is turned off, and the transistor TN7 is turned on. The transistor TN8 draws the current I2 from the capacitance C3 charged beforehand. The potential at point A therefore decreases linearly with time, according to a coefficient proportional to the current I2, until it reaches zero.

When the potential at point A changes to zero, the transistor TN9 is turned off, and the transistor TP9 is turned on. The current I2 in TP9 then charges the capacitance C4 (discharged beforehand), linearly with time, according to a proportionality coefficient I2. The output OUTDEL2 of the delay element DEL2 therefore changes progressively from a low logic level (i.e. 0) to a high logic level (i.e. 1, or OUTDEL2=DVCC=3 V).

Consequently, when the potential INDEL2 changes from 0 to 3 V, the output OUTDEL2 of the delay element DEL2 also changes from 0 to 3 V, but with a delay of $\tau_1 + \tau_2$, where $\tau_3$ is the discharge time of the capacitance C3 and where $\tau_4$ is the charge time of the capacitance C4, $\tau_3$ and $\tau_4$ both being proportional to the current I2, and, therefore, the difference of the output and supply voltages CVCC−VCC.

Conversely, when the potential INDEL2 goes from a high logic level (INDEL2=DVCC=3 V) to a low logic level (INDEL2=0), the transistor TN7 is turned off and the transistor TP7 is turned on, which causes a rapid charge (of negligible duration) of the capacitance C3, from the core voltage DVCC=3 V. The potential at point A therefore instantaneously goes from 0 to 3 V. The transistor TP9 is then turned off, and the transistor TN9 is turned on, which causes a rapid discharge (of negligible duration) of the capacitance C4 through TN9. The potential OUTDEL2 at the output of the delay element DEL2 therefore instantaneously goes from a high logic level to a low logic level, i.e. from 3V to 0.

Consequently, when the potential INDEL2 goes from 3V to 0, the output OUTDEL2 of the delay element DEL2 also goes from 3V to 0, almost instantaneously, without causing a consequent delay.

Figure 6:
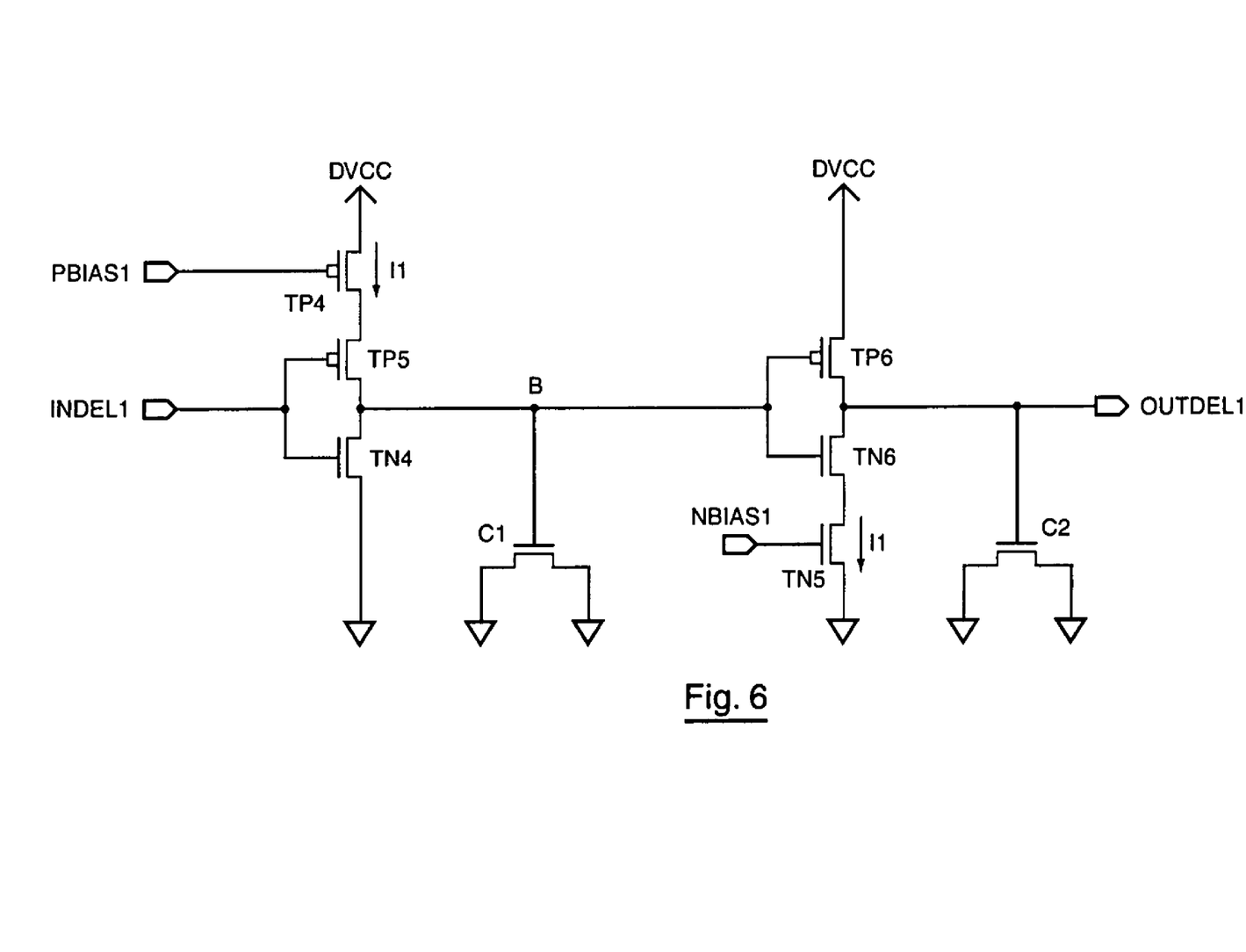
FIG. 6 more specifically shows the first delay element DEL1 regulating the accumulation time dt1 of the inductor.

FIG. 6 more specifically shows the structure of the delay element DEL1 enabling the accumulation time dt1 in the inductor 10 to be generated. The transistors TP2 (FIG. 4A) and TP4 (FIG. 6) form a current mirror making it possible to recopy the current I1 in the branch of DEL1 connecting the transistors TP4 and TP5. Similarly, the transistors TN2 (FIG. 4A) and TN5 (FIG. 6) form a current mirror making it possible to recopy the current I1 in the branch of DEL1 connecting the transistors TN5 and TN6.

In addition, the assembly formed by transistors TN4 and TP5 on the one hand, and transistors TP6 and TN6 on the other hand, forms two inverters.

When the potential INDEL1 goes from a high logic level (i.e. 1, or more specifically INDEL1=DVCC=3 V) to a low logic level (i.e. 0), the transistor TN4 is turned off, and the transistor TP5 is turned on. The current I1 therefore charges the capacitance according to a linear charge rule with the time proportional to I1, until the potential at point B reaches DVCC=3 V.

When this value is reached, the transistor TP6 is turned off and the transistor TN6 is turned on. The transistor TN5 therefore draws a current I1 from the capacitance C2, charged beforehand, which is therefore discharged toward the ground, linearly with time, according to a proportionality coefficient equal to the current I1. When the capacitance C2 is discharged, the potential OUTDEL1 at the output of the delay element DEL1 then goes to 0.

Consequently, when the potential INDEL1 goes from 3 V to 0 V, the output OUTDEL of the delay element DEL1 also goes from 3 V to 0 V, but with a delay of $\tau_1+\tau_2$, where $\tau_1$ is the capacitance C1 charge time and where $\tau_2$ is the capacitance C2 discharge time, $\tau_1$ and $\tau_2$ both being proportional to the current I1, and, therefore, to the supply voltage VCC.

Conversely, when the potential INDEL1 goes from a low logic level (INDEL1=0) to a high logic level (INDEL1=DVCC=3 V), the transistor TP5 is turned off, and the transistor TN4 is turned on. The capacitance C1, charged beforehand, is therefore discharged very quickly via the transistor TN4, so that the potential at point B almost instantaneously goes from 3 V to 0.

When this value is reached, the transistor TN6 is turned off, and the transistor TP6 is turned on. The capacitance C2 is therefore charged very quickly, via the transistor TP6, from the core voltage DVCC=3 V. The potential OUTDEL1 therefore goes very quickly from 0 to 3 V.

Consequently, when the potential INDEL1 goes from 0 to 3 V, the potential OUTDEL1 at the output of the delay element DEL1 also goes from 0 to 3 V, almost instantaneously, without a significant delay.

Returning to FIG. 4B, the principle of operation of the ring oscillator is deduced from the above.

When the potential at the input of the first delay element DEL1 $41_1$ goes from 0 to 3 V:
the output of the first delay element DEL1 $41_1$, which is the input of the first delay element DEL2 $42_1$, immediately goes from 0 to 3 V;
the output of the first delay element DEL2 $42_1$, which is the input of the second delay element DEL1 $41_2$, goes from 0 to 3 V after a time $\tau_3+\tau_4$ proportional to CVCC−VCC;
the output of the second delay element DEL1 $41_2$, which is the input of the second delay element DEL2 $42_2$, immediately goes from 0 to 3 V;
the output of the second delay element DEL2 $42_2$, which is the input of the third delay element DEL1 $41_3$, goes from 0 to 3 V after a time $\tau_3+\tau_4$ proportional to CVCC−VCC;
the output of the third delay element DEL1 $41_3$, which is the input of the third delay element DEL2 $42_3$, immediately goes from 0 to 3 V;
the output of the third delay element DEL2 $42_3$ goes from 0 to 3 V after a time $\tau_3+\tau_4$ proportional to CVCC−VCC.

The signal then quickly passes through the three inverters 45, 46 and 47, which reformat it and reverse it successively. Consequently, when the potential at the input of the first delay element DEL1 $41_1$ goes from 0 to 3 V, the signal CLKDCDC has a high-to-low transition from 3 V to 0 at the end of $3*(\tau_3+\tau_4)$=dt2, the discharge time of the inductor 10. It should be noted that, in this case, it is assumed, for the sake of simplification, that all of the delay elements DEL2 referenced $42_1$ to $42_3$ were identical and therefore had the same time constants $\tau_3$ and $\tau_4$. This does not, however, constitute a limitation of the invention.

By way of the feedback loop 48, the change of CLKDCDC from 3 V to 0 induces the change in the potential at the input of the first delay element DEL $41_1$ from 3 V to 0, which causes the following changes:
the output of the first delay element DEL1 $41_1$, which is the input of the first delay element DEL2 $42_1$, goes from 3 V to 0 after a time $\tau_1+\tau_2$ proportional to the supply voltage VCC;
the output of the first delay element DEL2 $42_1$, which is the input of the second delay element DEL1 $41_2$, immediately goes from 3 V to 0;
the output of the second delay element DEL1 $41_2$, which is the input of the second delay element DEL2 $42_2$, goes from 3 V to 0 after a time $\tau_1+\tau_2$ proportional to the supply voltage VCC;
the output of the second delay element DEL2 $42_2$, which is the input of the third delay element DEL1 $41_3$, immediately goes from 3 V to 0;
the output of the third delay element DEL1 $41_3$, which is the input of the third delay element DEL2 $42_3$, goes from 3 V to 0 after a time $\tau_1+\tau_2$ proportional to the supply voltage VCC;
the output of the third delay element DEL2 $42_3$ immediately goes from 3 V to 0.

The signal then quickly passes through the three inverters 45, 46 and 47, which reformat it and reverse it successively. Consequently, when the potential at the input of the first delay element DEL1 $41_1$ goes from 3 V to 0, the signal CLKDCDC has a low-to-high transition from 0 to 3 V at the end of $3*(\tau_1+\tau_2)$=dt1, the accumulation time in the inductor 10. Again, it should be noted that, in this case, it is assumed, for the sake of simplification, that all of the delay elements DEL1 referenced $41_1$ to $41_3$ were identical and therefore had the same time constants $\tau_1$ and $\tau_2$. As before, this does not limit the scope of the invention.

The signal CLKDCDC generated at the output of the ring oscillator of FIG. 4B therefore has:
a high logic level (CLKDCDC=DVCC=3 V) for a time dt1=$3*(\tau_1+\tau_2)$, proportional to the supply voltage VCC;
a low logic level (CLKDCDC=0) for a time dt2=$3*(\tau_3+\tau_4)$, proportional to the difference of the output and supply voltage CVCC−VCC.

Figure 7:
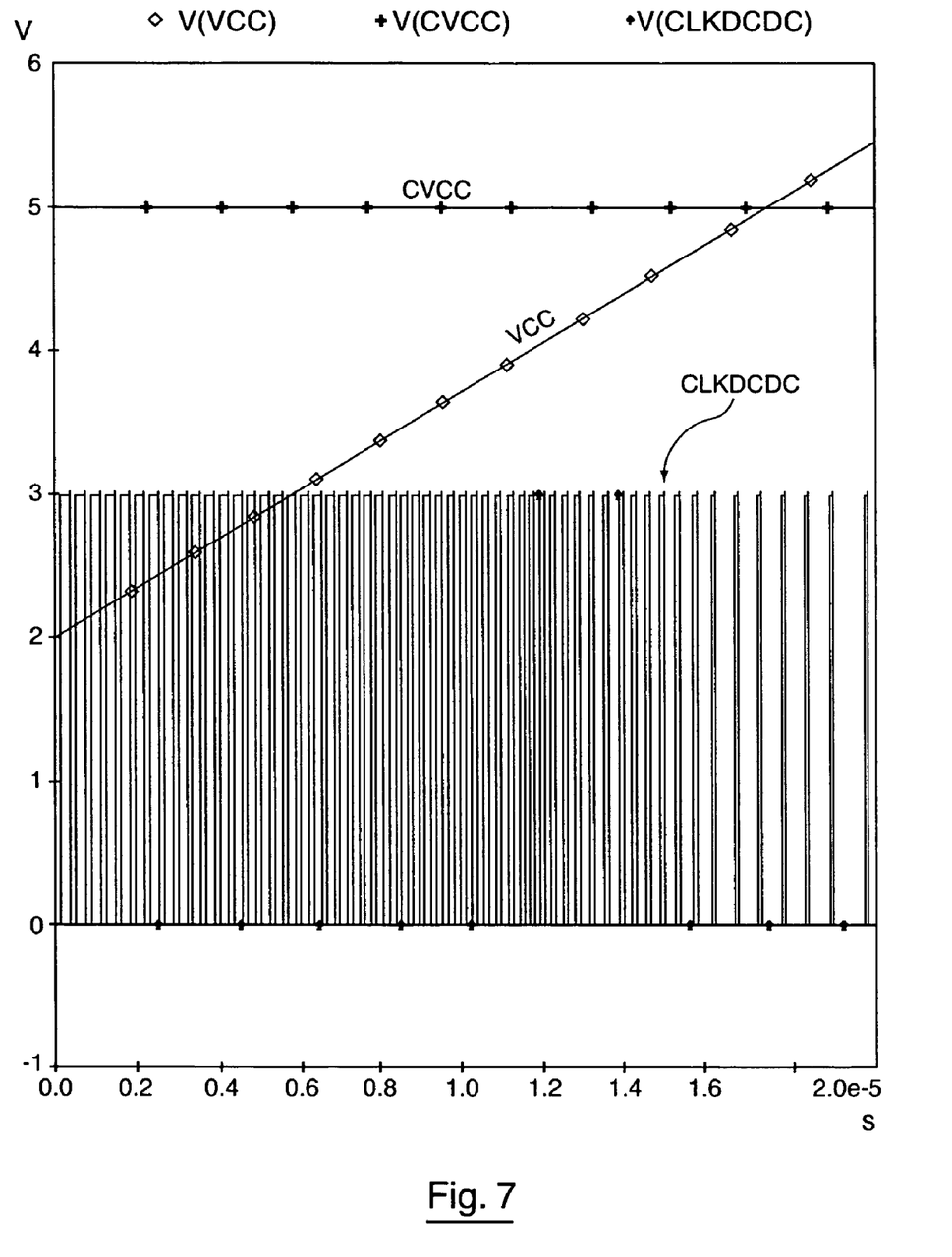
FIG. 7 shows the change in the cyclic ratio of the oscillation frequency of the converter of the invention as a function of the supply voltage.

In this way, both the frequency and the cyclic ratio of the signal CLKDCDC are successfully controlled, according to the input VCC and output CVCC voltages. FIG. 7 more specifically shows the change in the signal CLKDCDC generated at the output of the ring oscillator of FIG. 4B for an output voltage CVCC=5 V, when the supply voltage VCC varies from 2 V to 5.5 V. As shown in FIG. 7, the accumulation time dt1 (i.e. the time during which the signal CLKDCDC is at its high level) decreases when the supply voltage VCC increases. Simultaneously, the period T of the signal CLKD-CDC also increases when the supply voltage VCC increases.

The cyclic ratio R=dt1/T of the oscillator therefore decreases when the supply voltage VCC increases.

Figure 8:
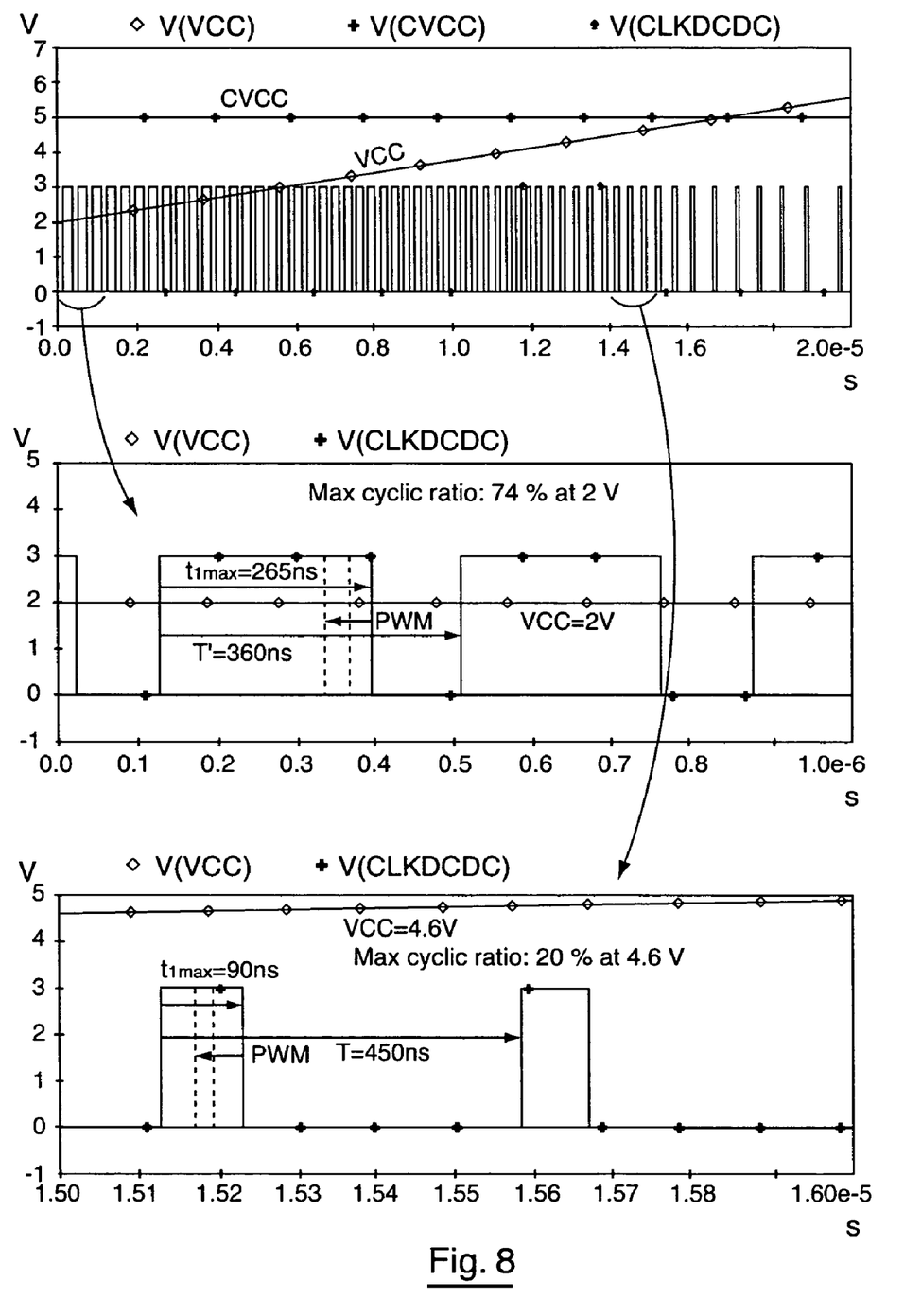
FIG. 8 details the form of the clock signal CLKDCDC for two distinct values of the supply voltage.

FIG. 8 more specifically shows the general principle of FIG. 7, and includes three diagrams, namely:

the upper diagram is identical to that of FIG. 7 and shows the change in the signal CLKDCDC for an output voltage CVCC=5 V and an supply voltage VCC varying from 2 V to 5.5 V;

the middle diagram constitutes an enlarged view of the upper diagram that more specifically shows the form of the signal CLKDCDC when the supply voltage VCC is around 2 V;

the lower diagram constitutes an enlarged view of the upper diagram, which more specifically shows the form of the signal CLKDCDC when the supply voltage VCC is around 4.6 V.

At VCC=2 V (middle diagram), the period of oscillations is T'=360 ns, and the PWM 30 can cause the accumulation time dt1 in the inductor 10 (as shown by the arrow PWM) to vary slightly to a maximum value $t1_{max}$=265 ns. Then, a maximum cyclic ratio $R_{max}$=$t1_{max}$/T' of around 74% is achieved.

At VCC=4.6 V (lower diagram), the period of oscillations is T'=450 ns, and the PWM 30 can cause the accumulation time dt1 in the inductor 10 (as shown by the arrow PWM) to vary slightly to a maximum value $t1_{max}$=90 ns. Then, a maximum cyclic ratio $R_{max}$=$t1_{max}$/T' of around 20% is achieved.

According to an imaginative feature of the invention, a margin of 5% is maintained on the maximum theoretical cyclic ratio necessary for proper functioning of the converter. In this way, the cyclic ratio of the clock signal H is controlled and regulated precisely by the assembly constituted by the differential amplifier 32 and the PWM 30, which makes it possible to obtain a precise output voltage CVCC. In other words, the ring oscillator performs a rough adjustment of the period and the cyclic ratio of the oscillations, which the PWM 30 then enables to be refined, according to the variations in the output voltage CVCC passed on by the differential amplifier 32.

Thus, the increase in this cyclic ration during a current draw can be only 5% greater than the balance ratio defined by di1=di2. This makes it possible to obtain a stable regulation system.

Moreover, this measure makes it possible, with respect to the converters of the prior art, to reduce the minimum operational supply voltage: indeed, the cyclic ratio R can increase by more than 50% (required limitation of the prior art, as described above), to reach, for example, values on the order of 80% if VCC=1.5 V, without causing any instability at VCC=4.8 V.

Furthermore, in the case in which the output voltage CVCC is programmable (for example, to have any one of the values 5 V, 3 V and 2 V), owing to the different dividing bridges R1 and R2, the oscillator is automatically adapted. This also makes it possible, in the initial charge of the output capacitance (i.e. at the start-up) to limit the charging current and prevent an excessive current draw (if the maximum cyclic ration $R_{max}$=80%). In this case of starting up the DC/DC converter, the maximum cyclic ration $R_{max}$ progressively increases from a few percent to 80% or more if necessary.

Figure 9:
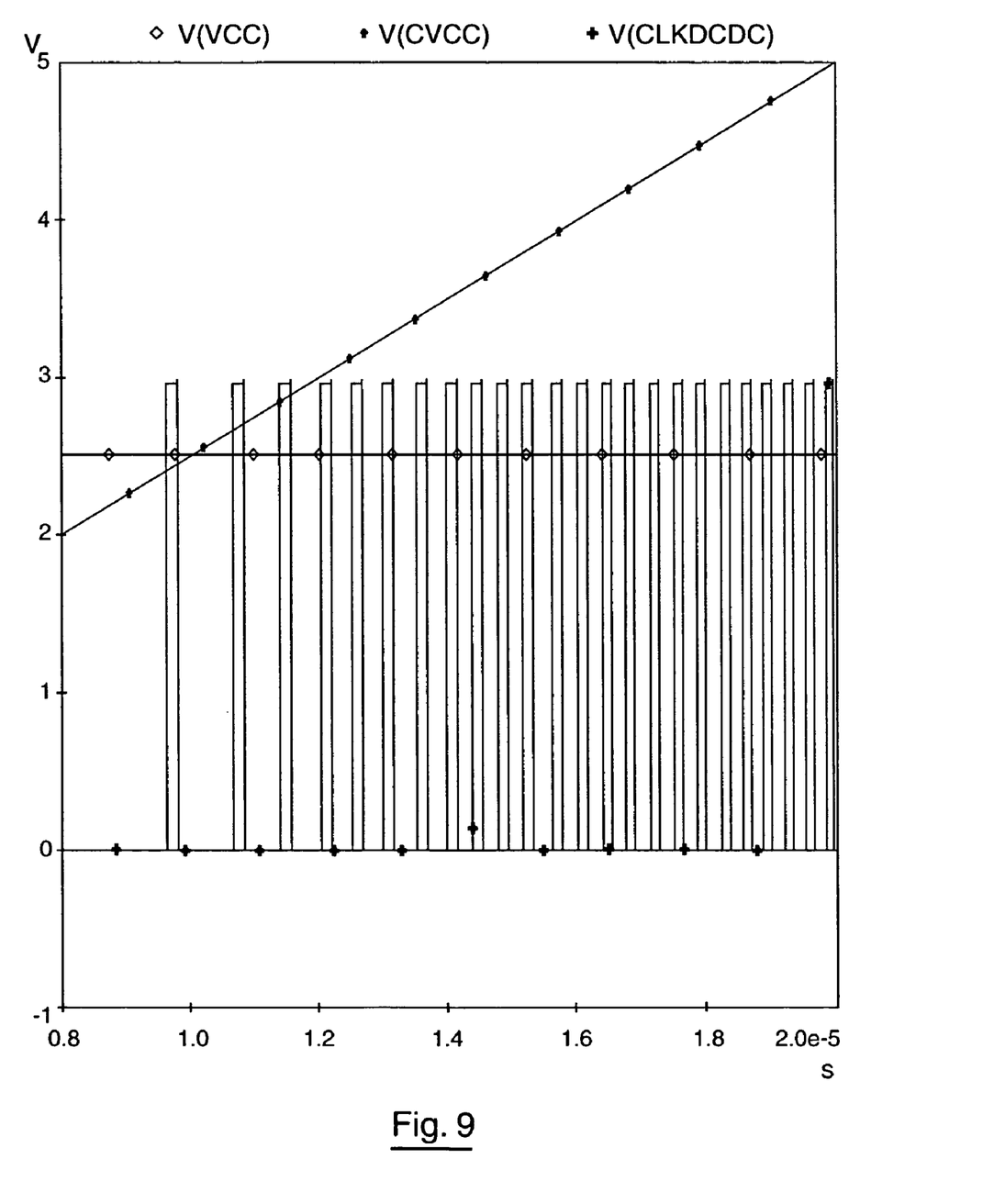
FIG. 9 shows, at a constant supply voltage, the change in the cyclic ratio and the frequency as a function of the change in the output voltage.

FIG. 9 more specifically shows the variation of CVCC from 2 V to 5 V for an supply voltage VCC of 2.5 V. The cyclic ratio increases and the frequency decreases as the difference between CVCC and VCC increases. Thus, the current draw at the start-up is controlled naturally. It is noted that, by contrast, a conventional system of the prior art generated a maximum cyclic ration $R_{max}$ of around 80% when CVCC<5 V, and therefore a very high current when CVCC=2.6 V, for example. Therefore, the accumulation current dI1 would be high, while the discharge current dI2 would be substantially zero (because CVCC–VCC would also be substantially zero): the mean current in the inductor 10, Imoy, would therefore continuously increase and could quickly reach several amperes, thus destroying the component.

According to the prior art, a complex and expensive surface system of silicon makes it possible in general to control this starting current. With the oscillator herein described, this additional control of the starting current is no longer necessary.

Similarly, as the maximum current is automatically limited, the DC/DC converter makes it possible to eliminate the need for overload control in any system.

What is claimed is:

1. A conversion device for converting a continuous supply voltage into a continuous output voltage, said conversion device includes:

at least one inductor configured to accumulate energy during an accumulation time and deliver said accumulated energy during a discharge time, so that said output voltage has a value that is greater than or equal to that of said supply voltage;

an oscillator configured to control said accumulation and discharge times, in which a period is equal to a sum of said accumulation time and said discharge time and a cyclic ratio is equal to the ratio of said accumulation time to said period, wherein said oscillator includes a mechanism adapted to control said period and said cyclic ratio according to said supply voltage and said output voltage.

2. The conversion device according to claim 1, wherein said control mechanism includes a first delay element enabling said accumulation time to be regulated, and second delay element enabling said discharge time to be regulated.

3. The conversion device according to claim 1, wherein said oscillator is a ring oscillator.

4. The conversion device according to claim 1, wherein said control mechanism include means for decreasing, respectively increasing said period, and means for increasing, respectively decreasing said cyclic ratio, which are activated when said supply voltage decreases, respectively increases.

5. The conversion device according to claim 4, wherein said control mechanism includes a first delay element enabling said accumulation time to be regulated, and second delay element enabling said discharge time to be regulated.

6. The conversion device according to claim 5, wherein said first delay element includes at least one first capacitance that can be charged from a first cuffent substantially proportional to said supply voltage, and in that said accumulation time is substantially equal to a time for charging said first capacitance.

7. The conversion device according to claim 5, wherein said second delay element includes at least one second capacitance that can be charged from a second cuffent substantially proportional to a difference between said supply voltage and said output voltage, and in that said discharge time is substantially equal to a time for charging said second capacitance.

8. The conversion device according to claim 5, wherein said first and second delay elements each include at least one capacitance that can be charged from at least one current controlled by said supply voltage and/or said output voltage.

9. The conversion device according to claim 8, wherein said second delay element includes at least one second capacitance that can be charged from a second current substantially proportional to a difference between said supply voltage and said output voltage, and in that said discharge time is substantially equal to a time for charging said second capacitance.

10. The conversion device according to claim 8, wherein said first and/or second delay elements each include at least two basic delay modules in cascade each including at least one of said capacitances chargeable by the controlled current.

11. The conversion device according to claim 8, wherein said first delay element includes at least one first capacitance that can be charged from a first cuffent substantially proportional to said supply voltage, and in that said accumulation time is substantially equal to a time for charging said first capacitance.

12. The conversion device according to claim 11, wherein said second delay element includes at least one second capacitance that can be charged from a second current substantially proportional to a difference between said supply voltage and said output voltage, and in that said discharge time is substantially equal to a time for charging said second capacitance.

13. The conversion device according to claim 12, wherein said oscillator is a ring oscillator.

14. The conversion device according to claim 13, wherein said ring oscillator also includes an odd number of inverters at the output of said first and second delay elements, forming means for formatting a signal controlling said accumulation and discharge times of said inductor.

15. The conversion device according to claim 13, wherein said first and/or second delay elements each include at least two basic delay modules in cascade each including at least one of said capacitances chargeable by the controlled current.

16. The conversion device according to claim 15, wherein said ring oscillator also includes an odd number of inverters at the output of said first and second delay elements, forming means for formatting a signal controlling said accumulation and discharge times of said inductor.

17. The conversion circuit of claim 16, wherein the conversion circuit is an element of an electronic.

18. An electronic circuit comprising a conversion device for convening a continuous supply voltage into a continuous output voltage, wherein said conversion device comprises:

at least one inductor configured to accumulate energy during an accumulation time and deliver said accumulated energy during a discharge time, so that said output voltage has a value that is greater than or equal to that of said supply voltage:

an oscillator configured to control said accumulation and discharge times, in which a period is equal to a sum of said accumulation time and said discharge time and a cyclic ratio is equal to the ratio of said accumulation time to said period, wherein said oscillator includes a mechanism adapted to control said period and said cyclic ratio according to said supply voltage and said output voltage.

* * * * *

UNITED STATES PATENT AND TRADEMARK OFFICE
CERTIFICATE OF CORRECTION

PATENT NO. : 7,518,345 B2  
APPLICATION NO. : 11/490488  
DATED : April 14, 2009  
INVENTOR(S) : Phillippe Messager Page 1 of 1

It is certified that error appears in the above-identified patent and that said Letters Patent is hereby corrected as shown below:

Column 12
Line 53, delete "cuffent" and insert --current--
Line 59, delete "cuffent" and insert --current--

Column 13
Line 12, delete "claim 8" and insert --claim 5--
Line 14, delete "cuffent" and insert --current--
Line 18, delete "claim 11" and insert --claim 5--

Column 14
Line 13, delete "electronic." and insert --electronic circuit.--
Line 15, delete "convening" and insert --converting--
Line 21, delete "voltage:" and insert --voltage;--

Signed and Sealed this

Sixth Day of October, 2009

David J. Kappos
*Director of the United States Patent and Trademark Office*